(12) United States Patent
Erik

(10) Patent No.: US 6,436,456 B1
(45) Date of Patent: *Aug. 20, 2002

(54) EDIBLE COLLAGEN CASING

(75) Inventor: Gayyur Erik, Weinheim (DE)

(73) Assignee: Naturin GmbH & Co., Weinheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/510,234

(22) Filed: Feb. 22, 2000

Related U.S. Application Data

(63) Continuation of application No. 08/910,249, filed on Aug. 13, 1997, now abandoned, which is a continuation of application No. PCT/EP96/00338, filed on Jan. 29, 1996.

(30) Foreign Application Priority Data

Feb. 13, 1995 (DE) .......................... 195 04 704

(51) Int. Cl.⁷ ............................................. A22C 13/00
(52) U.S. Cl. ...................................... 426/105; 426/140
(58) Field of Search ................................ 426/105, 135, 426/140; 138/118.1; 428/34.8

(56) References Cited

U.S. PATENT DOCUMENTS

| | | | |
|---|---|---|---|
| 2,046,541 A | 7/1936 | Becker | |
| 2,111,273 A | 3/1938 | Becker | |
| 2,161,908 A | 6/1939 | Becker | |
| 2,988,451 A | 6/1961 | Zahn | |
| 3,446,634 A | 5/1969 | Stahlberger | |
| 3,535,125 A | 10/1970 | Fagan | |
| 3,620,775 A | 11/1971 | Cohly | |
| 3,882,252 A | 5/1975 | Winkler | 426/140 |
| 3,930,036 A | 12/1975 | Burke | 426/140 |
| 3,943,262 A | 3/1976 | Winkler | 426/250 |
| 4,006,258 A | 2/1977 | Vaessen | 426/140 |
| 4,061,786 A | 12/1977 | Winkler | 426/138 |
| 4,081,562 A | 3/1978 | Winkler | 426/138 |
| 4,085,483 A | 4/1978 | Winkler | |
| 4,123,589 A | 10/1978 | Korlatzki | 428/425 |
| 4,174,436 A | 11/1979 | Korlatzki | 528/80 |
| 4,303,711 A | 12/1981 | Erk | 428/36 |
| 4,356,201 A | 10/1982 | Winkler | 426/138 |
| 4,560,520 A | 12/1985 | Erk | 264/22 |
| 4,601,929 A | 7/1986 | Erk | 428/36 |
| 4,621,482 A | 11/1986 | Crevasse | 53/439 |
| 4,716,713 A | 1/1988 | Crevasse | 53/530 |
| 4,719,116 A | 1/1988 | Crevasse | 426/315 |
| 4,786,512 A | 11/1988 | Erk | 426/105 |
| 4,897,295 A | 1/1990 | Erk | 428/34.8 |
| 4,910,034 A | 3/1990 | Winkler | 426/420 |
| 4,975,309 A | 12/1990 | Gord | 426/135 |
| 5,147,671 A | 9/1992 | Winkler | 426/140 |
| 5,520,925 A | 5/1996 | Maser | 424/443 |
| 5,612,104 A | 3/1997 | Grund | 428/348 |

FOREIGN PATENT DOCUMENTS

| | | |
|---|---|---|
| DE | 650 526 | 9/1937 |
| DE | 1 199 112 | 8/1965 |
| DE | 1 570 178 | 3/1970 |
| DE | 2 207 217 | 8/1973 |
| EP | 0 083 126 | 7/1983 |
| EP | 0 338 365 | 10/1989 |
| FR | 1 583 367 | 9/1969 |

*Primary Examiner*—Arthur L. Corbin
(74) *Attorney, Agent, or Firm*—Pillsbury Winthrop LLP

(57) ABSTRACT

Wreath-shaped edible collagen casings having a caliber between approximately 13 and 23 mm, a wall thickness of under 0.035 mm and an interior diameter of 100 mm to 350 mm, and a process for producing same. The wreath-shaped collagen casings are produced by treatment with ammonia and an aqueous coagulating agent immediately after extrusion, and a subsequent bordering process.

8 Claims, 2 Drawing Sheets

EDIBLE COLLAGEN CASING

This is a continuation of Ser. No. 08/910,249, filed Aug. 13, 1997, now abandoned, which is a continuation of PCT/EP96/00338, filed Jan. 29, 1996.

BACKGROUND OF THE INVENTION

1. Field of the Invention

The invention relates to garlands of edible collagen casings for producing sausages and other foodstuffs.

2. Background Information

To produce sausages, natural intestines and increasingly synthetic intestines based on collagen or cellulose are used. For certain types of sausages, such as Bratwurst and Würstchen, almost without exception natural intestines, specifically sheepgut, have been used, since collagen-based casings have until now have been until now unable to meet traditional consumer expectations.

The production of thin-walled straight collagen casings is quite familiar to one skilled in the art, for instance from U.S. Pat. Nos. 3,535,125, 3,620,775, or 3,505,084, or from German Patent 972 854. It is also already known, as an alternative to the thick-walled, tough garlands of pork intestine, to use collagen casings as described for instance in German Patent 2 314 767. In these methods for producing garlands of sausage casings, rotating, conically continuous revolving surfaces are used; the extruded, inflated collagen casing is transported over a plurality of conically recessed supporting elements disposed one after the other, with the aid of adjustable hoisting devices, and at the same time dried with air heated to 50° C. The garlands of collagen casings that can be made in this way cannot compare, however, with sheepgut in terms of their appearance or taste. By the method described in German Patent 2 314 767, it is also not possible to make thin-walled garland cases with a caliber range from 13 to 23 mm on an industrial scale, because that would require using low-viscosity collagen composition with a dry collagen content of 3.5 to 6.0%. Such a collagen compound is not sufficiently structurally firm, however, but instead is sticky, so that the production technique described in German Patent 2 314 767 is not suitable for producing such goods.

SUMMARY OF THE INVENTION

It is therefore the object of the invention to develop garlands of edible collagen casing that can be used as an alternative to the sheepgut.

To attain this object, edible collagen casings, having a caliber between approximately 13 and 23 mm and a wall thickness of less than 0.035 mm are proposed, which are characterized in that they are produced by means of a simultaneous treatment with ammonia and a coagulant that takes place directly after the extrusion, and by an ensuing garlanding process, known per se.

Surprisingly, it has now been found that tender thin-walled garlands of edible collagen casings can be produced on an industrial scale if the teaching of German Patent 2 314 767 is varied in such a way that the foil tube produced from the collagen suspension is treated on both the inside and the outside with coagulants directly downstream of the extrusion head; ammonia is used in the interior of the tube, while for the outer surface ammonia is again used, but preferably concentrated aqueous solutions of highly coagulant inorganic salts are employed. In this way, spontaneous coagulation of the vulnerable collagen extrudate is necessarily brought about. As a result of this provision, both the stickiness and the structural weakness of the freshly extruded, inflated collagen tube is already minimized, before it is placed on the conical transport segment of German Patent 2 314 767, far enough that continuous production of thin-walled small-caliber garlands of collagen casings with a caliber between 13 and 23 mm and a wall thickness of less than 0.035 mm is possible.

The delivery of the gaseous ammonia into the collagen tube is preferably accomplished through a feed line integrated with the extrusion head. Spraying the outer surface of the tube with a saturated solution of a strong coagulant is preferably done through spray nozzles arranged uniformly on the circumferential periphery of the tube. Following the coagulation, the collagen tube is predried and then washed to remove the inorganic salts that have formed; after that, the subsequent steps of tanning, softening, drying, remoistening, and coiling up or gathering up are completed as described in German Patent 2 314 767. These method steps are known and are state of the art, and are not the subject of this present invention.

The quantity of gaseous ammonia delivered to the interior of the tube, and both the quantity and concentration of the coagulant sprayed onto the outside of the surface can be varied within wide limits, as long as rapid coagulation of the freshly extruded tube of collagen compounds that are low in solids is reliably assured, which can be ascertained by simply preliminary tests.

The coagulation also reliably prevents sticking to the conical carrying and transport segments of the apparatus of German Patent 2 314 767, and moreover the simultaneous dual coagulation from the inside and the outside assures that tearing open of the tube when the extrudate is inflated with calibrating air will be lastingly prevented.

In principle, the dual coagulation from both the inside and the outside can be done with ammonia, but it is preferred that liquid coagulants be used for the outer surface, since they have a much more effective separating and lubricating action between the outer surface of the tube and the conical revolving faces. If only ammonia in gaseous form is used for both the inside and the outside, then the separating and lubricating effect is much less and is just barely acceptable, so that recurrent interruptions in production must be expected.

The collagen casings according to the invention preferably have an inside diameter of the garland ring of approximately 100 to 350 mm, because then they have an appearance equivalent to that of sheepgut. The wall thicknesses of the casing may either be equal, or it is also possible to use different wall thicknesses; preferably, the wall thickness of the inside diameter of the garland ring is slightly greater than that of the outside diameter of the garland ring.

BRIEF DESCRIPTION OF THE DRAWINGS

The invention will be described schematically below in conjunction with FIGS. 1–2.

Figure 1:
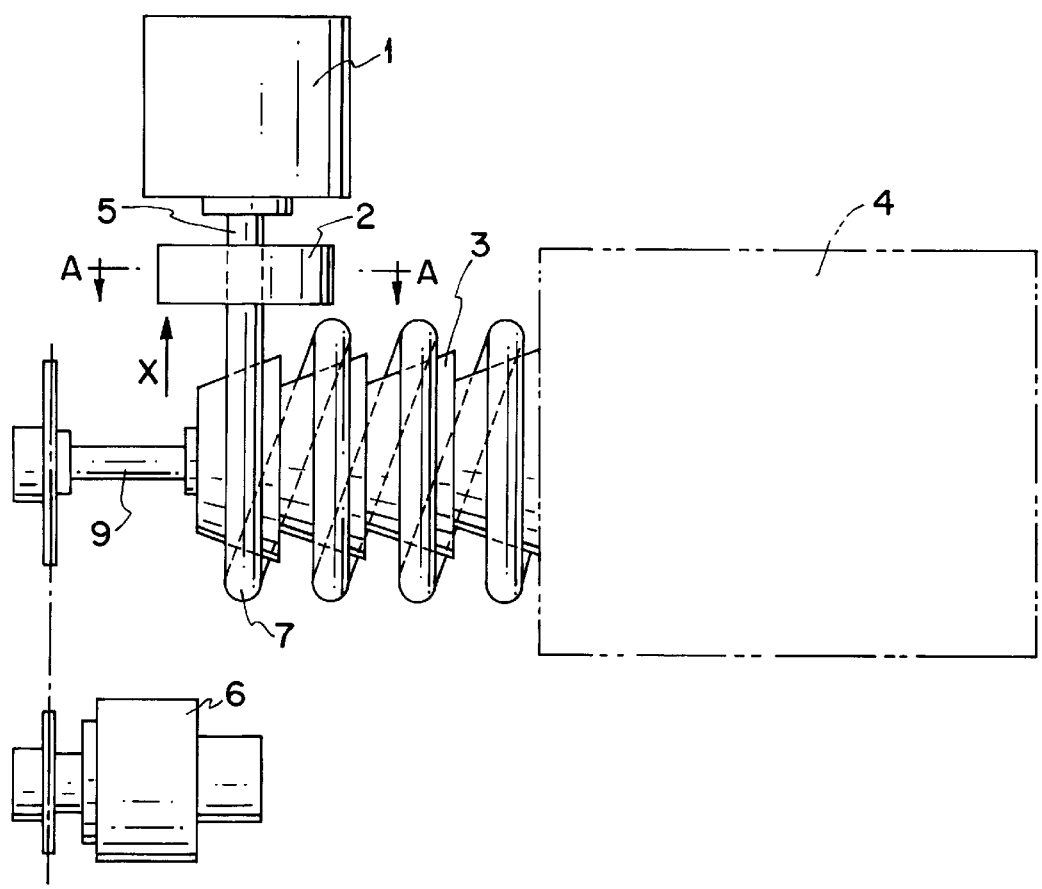
FIG. 1 shows the apparatus according to the invention for producing the ring casings.

The apparatus of the invention has the extruder 1 with an extruder head shown in a direct spatial vicinity of the cup shaft 3 that extends through the dryer 4. The extruded collagen tube 5, after leaving the extruder head, is set down on the chronologically synchronized cup shaft 3 having the conical transport segments; the fixation of the garland ring is done by the known method of German patent 2 314 767. Upon extrusion, collagen tube 5 is inflated. The collagen tube 5 leaves the extruder 1 with the same linear speed as the uptake speed of the cup shaft 3 having the conical transport segments, rotated via shaft 9, by power source 6. The freshly extruded tube is lifted by the non-driven lifting rolls 7 and guided to the dryer 4.

DETAILED DESCRIPTION OF THE INVENTION

The invention will also be described in terms of the following examples:

EXAMPLE 1

Figure 2:
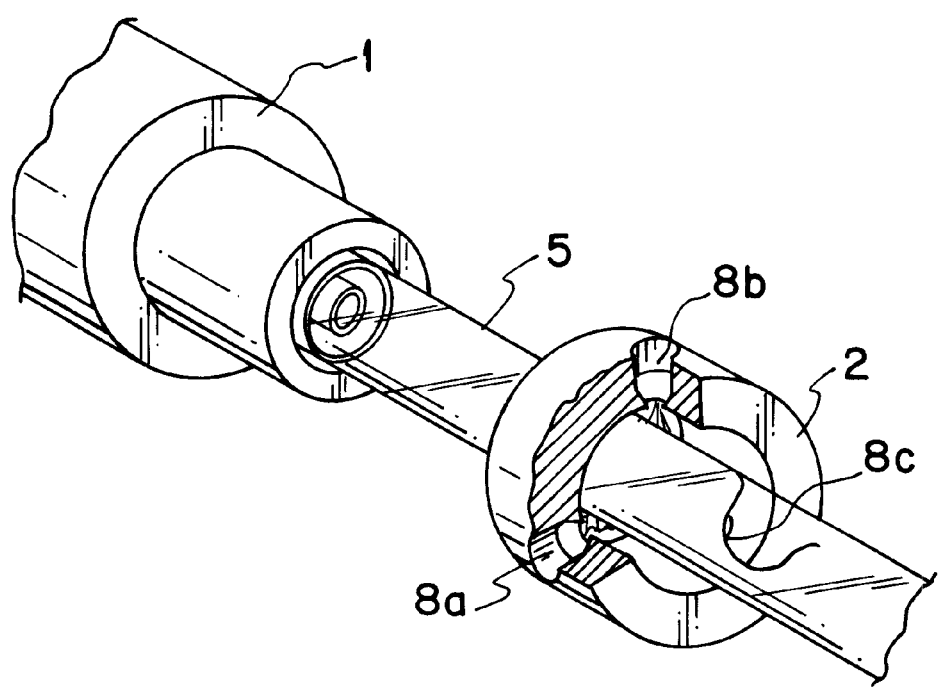
FIG. 2 shows the apparatus of the invention in the direction X.

From a collagen composition made in a known manner, for instance by the method of German Patent 972 864, with a collagen content of 5/0% referred to the dried collagen, a slightly curved tube with a diameter of 16.2 mm is extruded at a speed of 10 m/min through a nozzle with an eccentrically adjusted core. The collagen tube, inflated with head air to the desired starting diameter, is acted upon on its inside with a continuous stream of ammonia, and simultaneously is sprayed over the entire outside surface with saturated table salt solution, by means of three special nozzles disposed at 90° angles on the circumferential periphery. The disposition of the coagulation apparatus is as shown in front view in the aforementioned FIG. 2.

The collagen tube, which coagulates rapidly because of this treatment, is immediately thereafter deposited on the wreath shaping apparatus known from German Patent 2 314 767, which rotates at exactly the extrusion speed of the collagen tube. After predrying with heated air, the collagen tube in the course of further transport in the conduit, first passes through a stretch that has a water shower, so that the casing can be freed of the salts that have formed, such as ammonium chloride and table salt. Next, in a manner known per se, tanning, softening, drying, remoistening and coiling up are done.

The edible collagen casing wreath thus obtained has a wall thickness of 0.025 to 0.028 mm and a filling caliber of 17 mm. It is excellently well suited for producing so-called Nürnberger Bratwürstchen. When grilled and sauteed, and when the sensory properties are compared, no significant difference can be found between this collagen casing wreath and the Bratwürstchen made with a sheepgut.

A particular advantage of the collagen casings of the invention, in contrast to sheepgut, however, is that Würstchen with a constant weight and an exactly reproducible geometry can be made.

EXAMPLE 2

The collagen compound is treated as described in Example 1, but the coagulation is brought about by means of a 42% ammonium sulfate solution, using an eccentrically adjusted nozzle with an inside diameter of 19.5 mm. The process produces a collagen casing garland with a rated caliber of 21 mm. The product has properties that are comparable to those of Example 1.

EXAMPLE 3

The collagen compound is extruded as described in Example 1, but without ammonia treatment of the interior of the collagen tube directly after the extrusion. The structurally weak, sticky, extruded tube tears frequently and has weak points when inflated with the calibrating air. Continuous production is not possible in this way.

EXAMPLE 4

The collagen compound is extruded as in Example 1, but the outer surface is not sprayed with a liquid coagulant.

In this method, the extruded tube immediately sticks to the wreath shaping apparatus and tears. Continuous production is impossible.

What is claimed is:

1. An extruded edible wreath-shaped collagen casing having a caliber between approximately 13 and 23 mm, a wall thickness of less than 0.035 mm, and an internal ring diameter of between 100 and 350 mm, wherein the edible wreath-shaped collagen casing is formed from an ammonia and coagulant treated collagen composition having a dry collagen content of less than 6%.

2. The edible wreath-shaped collagen casing of claim 1, wherein the collagen composition comprises collagen from cowhides.

3. The collagen casing of claim 1, wherein the wall thickness is the same for both the outside and inside diameters of the wreath-shaped collagen casing.

4. The edible wreath-shaped collagen casing of claim 1, wherein the wall thickness differs for the inside and outside diameters of the wreath-shaped collagen casing.

5. The edible wreath-shaped collagen casing of claim 4, wherein the wall thickness at the inside diameter of the wreath-shaped collagen casing is greater than at the outside diameter.

6. A method of using the edible wreath-shaped collagen casing of claim 1 comprising filling the edible wreath-shaped collagen casing with foodstuffs.

7. The method of claim 6, further comprising filling the edible wreath-shaped collagen casing with a foodstuff selected from the group consisting of sausages and meat products.

8. The method of claim 7, wherein the sausages comprise Bratwurst and Wiener Wurst.

* * * * *

UNITED STATES PATENT AND TRADEMARK OFFICE
CERTIFICATE OF CORRECTION

PATENT NO.    : 6,436,456 B1
DATED         : August 20, 2002
INVENTOR(S)   : Erk It is certified that error appears in the above-identified patent and that said Letters Patent is hereby corrected as shown below:

<u>Title page,</u>
Item [75], the Inventor's name is: -- Gayyur Erk --

Signed and Sealed this

Fifteenth Day of April, 2003

JAMES E. ROGAN
*Director of the United States Patent and Trademark Office*